United States Patent
Mickelsen et al.

(10) Patent No.: US 10,282,025 B2
(45) Date of Patent: May 7, 2019

(54) CLICKABLE TOUCHPAD SYSTEMS AND METHODS

(71) Applicant: DISH TECHNOLOGIES LLC, Englewood, CO (US)

(72) Inventors: Jeremy Mickelsen, Denver, CO (US); Luke VanDuyn, Highlands Ranch, CO (US)

(73) Assignee: DISH TECHNOLOGIES LLC, Englewood, CO (US)

( * ) Notice: Subject to any disclaimer, the term of this patent is extended or adjusted under 35 U.S.C. 154(b) by 0 days.

(21) Appl. No.: 14/585,549

(22) Filed: Dec. 30, 2014

(65) Prior Publication Data

US 2016/0188108 A1 Jun. 30, 2016

(51) Int. Cl.
| | |
|---|---|
| *G06F 3/044* | (2006.01) |
| *G01R 27/26* | (2006.01) |
| *G06F 3/041* | (2006.01) |
| *G06F 3/01* | (2006.01) |
| *G06F 21/32* | (2013.01) |
| *H04N 21/422* | (2011.01) |
| *G06F 3/0354* | (2013.01) |

(52) U.S. Cl.
CPC ............ *G06F 3/0418* (2013.01); *G06F 3/016* (2013.01); *G06F 3/03547* (2013.01); *G06F 3/041* (2013.01); *G06F 21/32* (2013.01); *H04N 21/42224* (2013.01); *G06F 2203/04105* (2013.01)

(58) Field of Classification Search
CPC .......... G06F 3/04; G06F 3/044; G06F 3/0414; G01R 27/26; G01R 27/2605

USPC .................. 324/658, 661, 678; 345/173–176
See application file for complete search history.

(56) References Cited

U.S. PATENT DOCUMENTS

| | | | | |
|---|---|---|---|---|
| 2006/0250377 A1* | 11/2006 | Zadesky | ............... | G06F 1/1613 345/173 |
| 2008/0048997 A1* | 2/2008 | Gillespie | ................. | G06F 3/041 345/174 |
| 2008/0088600 A1* | 4/2008 | Prest | .................... | G06F 3/03547 345/173 |
| 2009/0135145 A1* | 5/2009 | Chen | ....................... | G06F 3/041 345/173 |
| 2010/0127995 A1* | 5/2010 | Rigazio | ................. | G06F 3/0418 345/173 |
| 2012/0098783 A1* | 4/2012 | Badaye | ................... | G06F 3/044 345/174 |
| 2012/0105358 A1* | 5/2012 | Momeyer | ............. | G06F 3/0414 345/174 |
| 2013/0222277 A1* | 8/2013 | O'Hara | .................. | G06F 21/32 345/173 |

(Continued)

*Primary Examiner* — Neel D Shah
(74) *Attorney, Agent, or Firm* — Lorenz & Kopf LLP

(57) ABSTRACT

Methods, systems, and devices for improved clickable touchpads are described. An input device includes a touchpad component configured to produce positional information associated with an input object sensed within a sensing region of the touchpad component and to sense a click event produced by the input object within the sensing region. The input device further includes a compensation module communicatively coupled to the touchpad component, the compensation module configured to produce an output that compensates for a change in the positional information due to at least one of movement and deformation of the input object during the click event.

9 Claims, 3 Drawing Sheets

(56) References Cited

U.S. PATENT DOCUMENTS

| | | | |
|---|---|---|---|
| 2014/0210728 A1* | 7/2014 | Busse | G06F 9/4443 345/173 |
| 2014/0253488 A1* | 9/2014 | Vukovic | G06F 3/0418 345/174 |
| 2016/0041689 A1* | 2/2016 | Yumoto | G06F 3/044 345/174 |

* cited by examiner

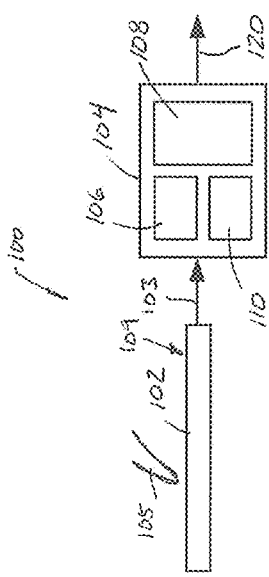
FIG. 1
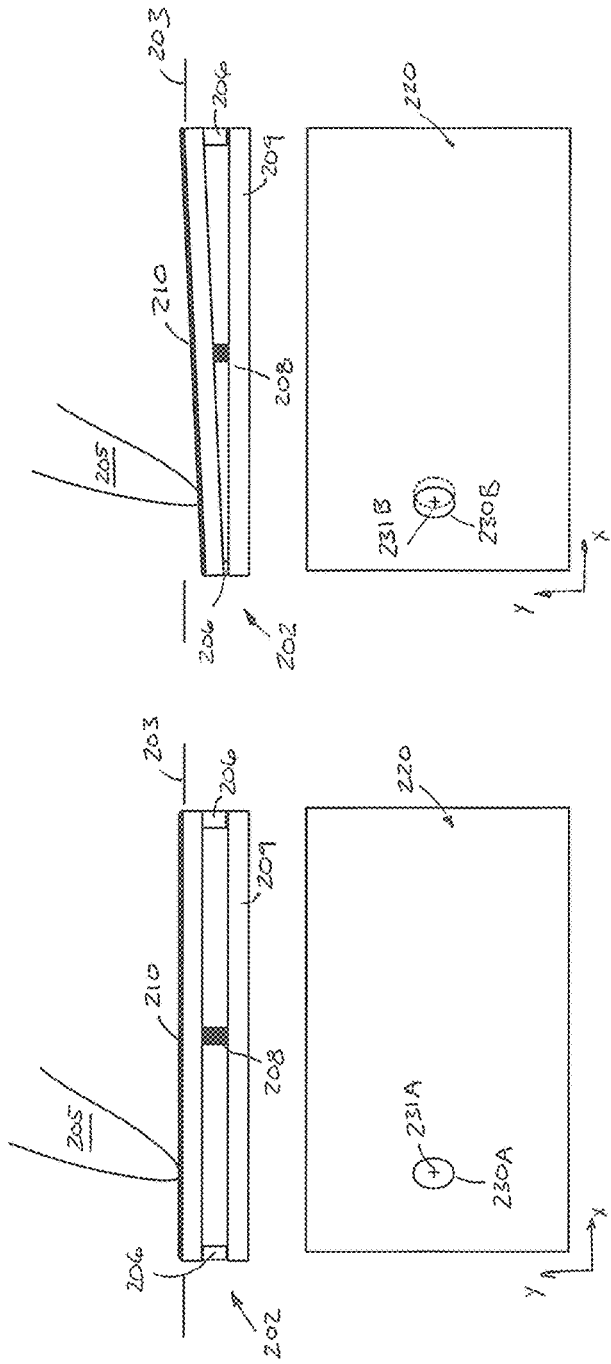
FIG. 2A
FIG. 2B

CLICKABLE TOUCHPAD SYSTEMS AND METHODS

TECHNICAL FIELD

The present disclosure generally relates to input devices. More particularly, the following discussion relates to systems, methods, and devices for improved clickable touchpads.

BACKGROUND

Modern computing devices—such as laptop computers, media players, hand-held devices, etc.—often incorporate a touchpad component as a pointing device. The touchpad, which typically includes a capacitive or resistive sensing layer or the like, is configured to translate the motion and position of a user's fingers, thumbs, and/or stylus to a relative position on the computing device display. In addition, some such touchpads are "clickable" in that pressing downward on the touchpad effects another user interface input, such as a traditional mouse click or a drag event.

While clickable touchpads are generally very compact and provide significant functionality, conventional clickable touchpads are undesirable in a number of respects. For example, when a user clicks a touchpad using a digit (e.g., a finger or thumb), the action of clicking (and subsequent downward movement of the touchpad surface) can cause the positional information to change due to "rolling" of the digit as well as asymmetrically increasing surface area that results from the digit being pressed down. Furthermore, because of the variability in touchpad geometry and digit size from user-to-user, it is difficult to compensate for this effect using a simple correction factor.

There is therefore a need for systems, devices, and techniques for improved clickable touchpad components that can compensate for digit movement during a click event. These and other desirable features and characteristics will become apparent from the subsequent detailed description and the appended claims, taken in conjunction with the accompanying drawings and this background section.

BRIEF SUMMARY

An input device in accordance with an exemplary embodiment includes a touchpad component and a compensation module. The touchpad component is configured to produce positional information associated with an input object (e.g., a finger, thumb, or stylus) sensed within a sensing region of the touchpad component and to sense a click event produced by the input object within the sensing region. The input device further includes a compensation module communicatively coupled to the touchpad component, wherein the compensation module is configured to produce an output that compensates for a change in the positional information due to at least one of movement and deformation of the input object during the click event.

A touchpad sensing method in accordance with one embodiment includes producing positional information associated with an input object sensed within a sensing region of the touchpad component, and sensing a click event produced by the input object within the sensing region. The method further includes receiving the positional information and producing an output that compensates for a change in the positional information due to at least one of movement and deformation of the input object during the click event.

Alternate embodiments, aspects and other features are described in more detail herein.

BRIEF DESCRIPTION OF THE DRAWING FIGURES

Exemplary embodiments will hereinafter be described in conjunction with the following drawing figures, wherein like numerals denote like elements, and:

FIG. 1 is simplified, conceptual block diagram of a touchpad system in accordance with various embodiments.

FIGS. 2A and 2B are cross-sectional images illustrating movement of an exemplary clickable touchpad during a click event.

Figure 4:
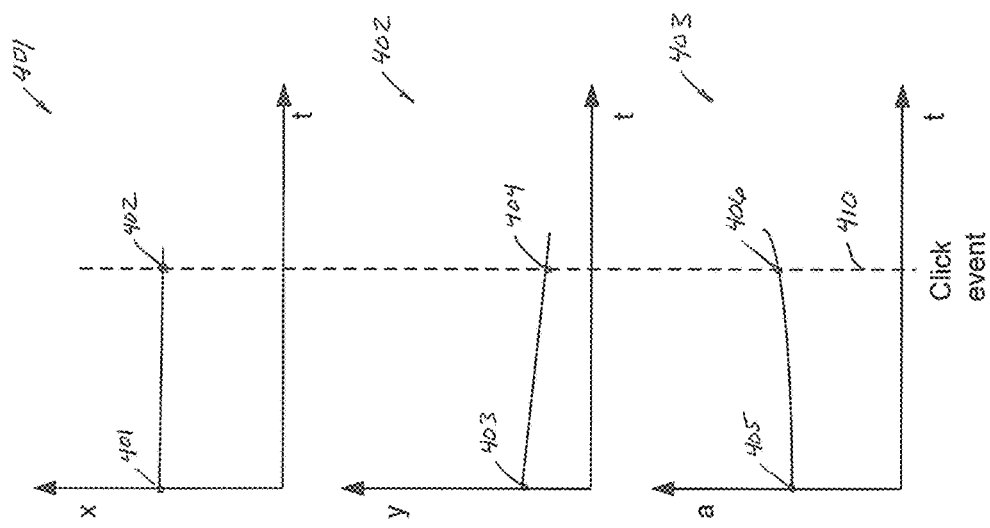

FIG. 4 includes graphs illustrating example movement and deformation of a digit as a function of time.

Figure 5:
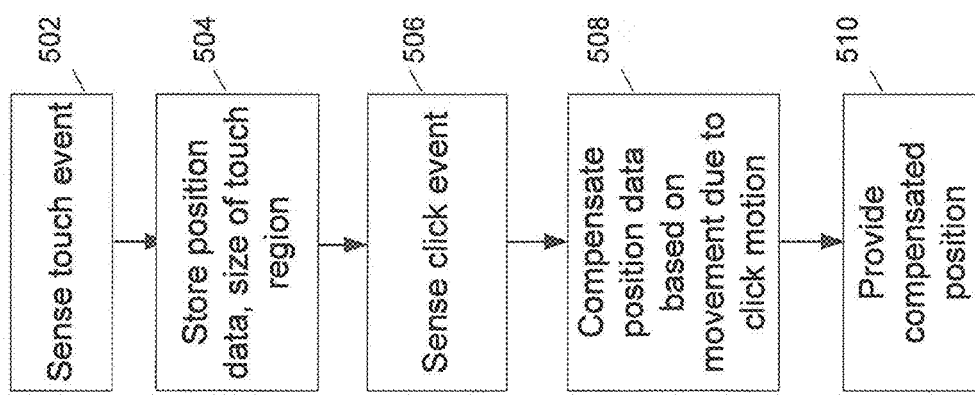

FIG. 5 is a flow chart depicting a method in accordance with one embodiment.

Figure 6:
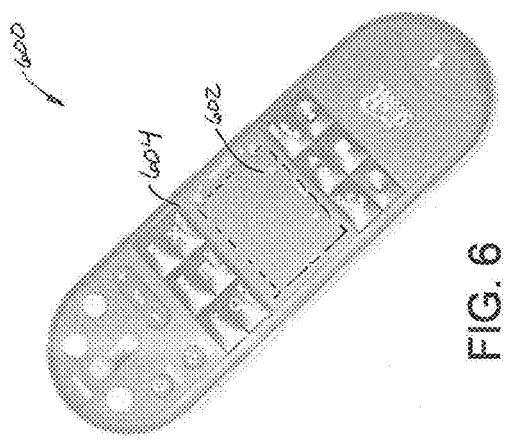

FIG. 6 is an image of a remote control device in accordance with one embodiment.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Referring now to the conceptual block diagram of FIG. 1, an input device 100 in accordance with an exemplary embodiment includes a touchpad component (or simply "touchpad") 102 and a compensation module 104. In general, touchpad component 102 is configured to produce positional information 103 associated with an input object 105 (e.g., one or more fingers, thumbs, stylii, etc.) sensed within a sensing region 109 of the touchpad component 102 and to sense a click event produced by input object 105 within the sensing region. Touchpad component 102 is thus what is referred to as a "clickable" touchpad, and may be implemented using any touchpad technology now known or later developed and may employ any convenient form of sensing method, such as capacitive, resistive, optical, acoustic, etc. The "clickable" nature of touchpad may likewise be provided through any combination of switches, deformable structures, and other such components. Touchpad 102 might also include its own processor, memory, etc. to provide pre-processing or interpretation of the positional information. Because the nature and operation of clickable touchpads such as touchpad 102 are well known in the art, and because the present embodiments may be employed in the context of any suitable touchpad application, such clickable touchpads need not be described in detail herein.

Positional information 103 produced by touchpad 102 may vary depending upon the nature and design of touchpad 102, but in one embodiment generally includes planar coordinates associated with the location of input object 105 (i.e., x and y position using any suitable coordinate system) as well as a size metric (e.g., the contact area of input object 105). In other embodiments, positional information 103 includes an "image"—i.e., a two-dimensional matrix of suitable resolution indicating the contact area of input object 105 within sensing region 109.

As illustrated in FIG. 1, input device 100 further includes a compensation module 104 communicatively coupled to touchpad 102. In the illustrated embodiment, compensation module 104 includes a processor 108, a memory component 106 (e.g., DRAM or the like), and a storage component 110 (e.g., non-volatile memory). The invention is not so limited, however; compensation module 104 includes any suitable combination of hardware and/or software configured to produce an output 120 that compensates for a change in the positional information due movement and/or deformation of input object 105 during a click event. The output 120 of the compensation module may be corrected positional information (e.g., x and y values of what has been determined to be the "intended" location), or simply one or more correction factors to be applied to the positional information already determined by the system.

For the purposes of illustration, FIGS. 2A and 2B depict the movement of a clickable touchpad in accordance with one, non-limiting embodiment. More particularly, FIG. 2A depicts a touchpad 202 comprising a top surface (and sensing region) 210, a base portion 209, one or more deformable structures 206, an input object 205, and an actuator (e.g., switch or other "clickable" component) 208. Touchpad 202 may be rigidly coupled to or mounted within a housing 203 (e.g., of a laptop computer or remote control device).

Those skilled in the art will understand that FIGS. 2A and 2B illustrate (in simplified form) just one possible mechanical implementation in which one or more edges of sensing region 210 are supported, and switch 208 is centrally located. In other embodiments, sensing region 210 may pivot along only one edge, with switch 208 located in any convenient location with respect to sensing region 210. The embodiment shown in FIGS. 2A and 2B are presented without loss of generality.

Below the cross-section of touchpad 202 in FIG. 2A is a top-view of sensing region 210 illustrating a contact region 230A of input object 205 as well as a centroid 231A of that region. While FIG. 2A depicts contact region 230A as being a simple ellipse, it will be understood that contact region 230A may have a variety of shapes, depending upon the size and nature of input object 205.

Figure 3:
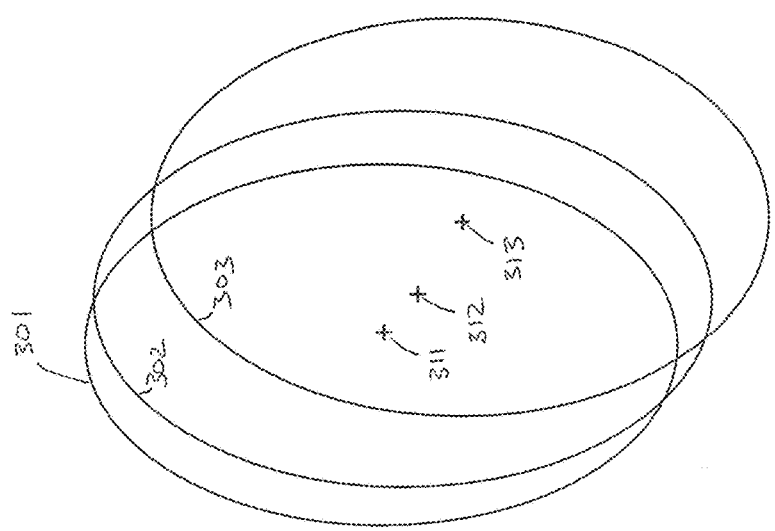
FIG. 3 is a conceptual diagram illustrating movement of a digit during a click event.

FIG. 2A illustrates the case where switch 208 has not yet been activated (i.e., touchpad 202 has not been "clicked"), while FIG. 2B illustrates the case where sufficient downward force has been applied by input object 205 that switch 208 has been activated, i.e., a "click event" has occurred. Because of the deformation and/or movement of input object 205 during or just prior to the click event (i.e., between the times represented by FIGS. 2A and 2B), the contact region 230B at this moment has a different centroid (231B) and different shape/size than contact region 230A. FIG. 3 depicts, in magnified form, a time history including three successive examples of input object positions: 301, 302, and 303, each having respective centroids 301, 302, and 303. The number of such positions available will vary depending upon, for example, the sampling rate of the touchpad.

An object of the present embodiments is thus to compensate for movement and deformation of the input object such that the "intended" contact region (301) can be determined given contact region 303 and the past time history of positional information associated with input object 205. This process may generally be referred to as "temporal regression." In one embodiment, compensation module 104 is further configured to produce an output that compensates for a change in the positional information due to a pressure difference sensed (e.g., via a resistive and/or capacitive technique) during the click event In this regard, compensation module 104 (FIG. 1) may be configured to store, within memory 106, the time history of the positional information prior to the click event, and is further configured to produce an output based on positional information occurring within the time history a predetermined time before the click event. As mentioned previously, the positional information may comprise x-y coordinates, summary statistics, actual capacitive images, or any data structure in between. In one embodiment, the time history includes a first-in, first-out (FIFO) array of x and y value pairs.

FIG. 5 depicts, in general, a method in accordance with one embodiment, which begins with the sensing of a touch event (step 502). This might correspond to the user initiating a pointing, dragging, or other gesture. Subsequently, at step 502, the system stores (e.g., in memory 106 of FIG. 1), the positional data until a click event is sensed (step 506). The system then compensates for the movement due to the click motion (step 508), and provides the compensated position for use by an external system (e.g., the operating system of a computer). As mentioned previously, the compensated position information may include actual "intended" positional data or simply a set of correction factors for the positional data that has already been determined FIG. 4 further illustrates, in graphical form, positional information that might be stored in accordance with one embodiment. That is, graph 401 illustrates the change in x (i.e., the x-coordinate of the contact region's centroid) as a function of time t starting from some arbitrary time prior to the click event to a point 402 corresponding to click event 410. Similarly, graph 402 shows the y-coordinate as a function of time varying from a value 403 to a value 404, and graph 403 shows some size metric a (e.g., area of contact or other attribute) as a function of time varying from 405 to 406.

In accordance with one embodiment, compensation for movement of the input object may be accomplished by selecting an x, y, and a value that occurred some predetermined time (e.g., 0.01 to 0.25 seconds) or some predetermined number of samples (e.g., 2-4 samples) prior to the click event 410. In one embodiment, the predetermined time is based on the positional information itself That is, the movement of the input object during a click event might depend upon the position of that input object relative to the sensing region. For example, a user's thumb might deform more when the click occurs near the center of the contact region than it would when the click occurs near the edges of the contact region. Memory 106 and/or storage 110 of compensation module 104 might then store a look-up table, statistical models, or any other suitable data structure capable of characterizing or approximating this variation in input object movement.

In accordance with one embodiment, compensation module 104 attempts to determine when the click event began (i.e., when the user intended to stop his finger and press down). This may be determined, for example, by inspecting the stored time history to find the point just prior to when the contact area increased by a predetermined amount.

In another embodiment, the compensation module 104 attempts to determine from the time history the point at which the user exhibited some form of "positional hesitation." That is, some users will move to a location on the touchpad and then hesitate briefly before clicking rather than smoothly and continuously clicking just as the desired location is reached.

In accordance with another embodiment, the compensation module is further configured to determine the identity of the user based on the positional information. That is, the system might determine that a particular user typically has a larger thumb contact area than another user. This user-specific information can then be utilized to further refine the method used by compensation module 104.

In accordance with another embodiment, compensation module 104 is configured to determine whether the user is operating the device with their right hand, left hand, or if the handedness is indeterminate. This can be determined, for example, based on the direction of movement of the input object during the click event (i.e., the contact centroid for the thumb of a right hand might tend to roll slightly down and to the right during a click event as the contact point moves toward the pad from the tip of the thumb). Even in the case where a user operates the clickpad primarily with the pad of his thumb and rolls toward the tip during clicks (which will have the reverse movement—up and to the left), the hand operating can be determined by comparing the slope of motion, which will nominally be the negative of use by the opposing hand. This "handedness" may further be used to identify the user, as mentioned above.

While the present embodiments may be used in connection with touchpads used in a variety of contexts, FIG. 6 depicts a particular embodiment corresponding to an advanced remote control device 600 having a housing 604 and a touchpad 602 coupled thereto. Remote control devices pose a particular problem with respect to finger and thumb movement during a click event in that such devices are typically held in the hand itself during operation (rather than supported by a desk or other surface, as would be the case with a laptop computer). As a result, finger movement may be exaggerated in an embodiment as shown in FIG. 6. In this regard, compensation module 104 may be further configured to account for movement of remote control device 604 (e.g., a rolling movement in the palm) during a click event.

Many other modifications and enhancements could be provided in a wide array of alternate but equivalent embodiments. The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. An input device comprising:
   a touchpad component configured to produce positional information associated with an input object sensed within a sensing region of the touchpad component and to sense a click event produced by the input object within the sensing region; and
   a compensation module communicatively coupled to the touchpad component;
   wherein the sensing region has a substantially planar top surface and pivots to sense click events entered by a user utilizing the touchpad component;
   wherein the compensation module is configured to:
      store, in memory, a time history of the positional informational produced by the touchpad component; and
      when a click event is sensed by the touchpad component: (i) utilize the stored time history to identify a beginning of the sensed click event; (ii) determine a position of the input object a predetermined time period or a predetermined number of samples prior to the beginning of the sensed click event; and (iii) generate an output based, at least in part, on the determined position of the input object to compensate for any unintended change in planar coordinates of the positional information occurring during the sensed click event; and
   wherein the compensation module is configured to identify the beginning of the sensed click event by inspecting the stored time history to determine a point at which a contact area of the input object increased by a predetermined amount.

2. The input device of claim 1, wherein the output of the compensation module includes corrected positional information.

3. The input device of claim 1, wherein the output of the compensation module includes a correction factor to be applied to the positional information.

4. The input device of claim 1, wherein the positional information includes planar coordinates and a size metric associated with the input object.

5. The input device of claim 1, wherein the compensation module is further configured to produce an output that compensates for a change in the positional information due to a pressure difference sensed during the click event.

6. The input device of claim 1, wherein the compensation module is further configured to determine an identity of the user based on the positional information.

7. An input device, comprising:
   a touchpad component configured to produce positional information associated with an input object sensed within a sensing region of the touchpad component and to sense a click event produced by the input object within the sensing region; and
   a compensation module communicatively coupled to the touchpad component;
   wherein the sensing region has a substantially planar top surface and pivots to sense click events entered by a user utilizing the touchpad component;
   wherein the compensation module is configured to:
      store, in memory, a time history of the positional informational produced by the touchpad component; and
      when a click event is sensed by the touchpad component; (i) utilize the stored time history to identify a beginning of the sensed click event; (ii) determine a position of the input object a predetermined time period or a predetermined number of samples prior to the beginning of the sensed click event; and (iii) generate an output based, at least in part, on the determined position of the input object to compensate for any unintended change in planar coordinates of the positional information occurring during the sensed click event; and
   wherein the compensation module is configured to identify the beginning of the sensed click event by inspecting the stored time history to determine a point at which the user hesitated prior to pressing the sensing region with the input object to cause the sensed click event.

8. An input device comprising:
   a touchpad component configured to produce positional information associated with an input object sensed within a sensing region of the touchpad component and to sense a click event produced by the input object within the sensing region; and a compensation module communicatively coupled to the touchpad component;

wherein the input device assumes the form of a remote control having a housing to which the sensing region is rigidly coupled;

wherein the compensation module is configured to:
 store, in memory, a time history of the positional informational produced by the touchpad component; and
 when a click event is sensed by the touchpad component:
  utilize the stored time history to identify a beginning of the sensed click event;
  determine a position of the input object a predetermined time period or a predetermined number of samples prior to the beginning of the sensed click event; and
  generate an output based, at least in part, on the determined position of the input object to compensate for any unintended change in planar coordinates of the positional information occurring due to movement of the remote control in a hand of the user during the sensed click event; and wherein the compensation module is configured to identify the beginning of the sensed click event by inspecting the stored time history to determine a point at which a contact area of the input object increased by a predetermined amount.

9. The input device of claim 8, wherein the compensation module is further configured to identify the beginning of the sensed click event by inspecting the stored time history to determine a point at which the user hesitated prior to pressing the sensing region with the input object to cause the sensed click event.

* * * * *